US012561602B2

(12) United States Patent　　　　(10) Patent No.:　US 12,561,602 B2
　　Cao et al.　　　　　　　　　　　　　(45) Date of Patent:　　　Feb. 24, 2026

(54) REINFORCEMENT LEARNING BASED CONTROL OF IMITATIVE POLICIES FOR AUTONOMOUS DRIVING

(71) Applicants: TOYOTA RESEARCH INSTITUTE, INC., Los Altos, CA (US); THE BOARD OF TRUSTEES OF THE LELAND STANFORD JUNIOR UNIVERSITY, Stanford, CA (US)

(72) Inventors: Zhangjie Cao, Stanford, CA (US); Erdem Biyik, Stanford, CA (US); Woodrow Zhouyuan Wang, Stanford, CA (US); Allan Raventos, San Francisco, CA (US); Adrien Gaidon, San Jose, CA (US); Guy Rosman, Newton, MA (US); Dorsa Sadigh, Stanford, CA (US)

(73) Assignees: TOYOTA RESEARCH INSTITUTE, INC., Los Altos, CA (US); THE BROAD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 797 days.

(21) Appl. No.: 17/002,650

(22) Filed: Aug. 25, 2020

(65) Prior Publication Data

US 2021/0398014 A1　　Dec. 23, 2021

Related U.S. Application Data

(60) Provisional application No. 63/052,194, filed on Jul. 15, 2020, provisional application No. 63/040,190, filed on Jun. 17, 2020.

(51) Int. Cl.
　　*G06N 20/00*　　　　(2019.01)
　　*B60W 60/00*　　　　(2020.01)
　　　　　　(Continued)

(52) U.S. Cl.
　　CPC ........... *G06N 20/00* (2019.01); *B60W 60/001* (2020.02); *B60W 60/0011* (2020.02); *G06N 3/092* (2023.01); *G06N 7/01* (2023.01)

(58) Field of Classification Search
　　CPC ......... G06N 20/00; G06N 7/01; G06N 3/045; G06N 3/08; G05D 1/0221; G05D 1/0246
　　See application file for complete search history.

(56) References Cited

U.S. PATENT DOCUMENTS

| | | | | |
|---|---|---|---|---|
| 10,769,525 B2 * | 9/2020 | Redding | .............. | G05B 13/027 |
| 2017/0297586 A1 * | 10/2017 | Li | .................... | B60W 50/0097 |

(Continued)

OTHER PUBLICATIONS

Pineau, "A POMDP Tutorial", 2013, European Workshop on Reinforcement Learning 2013, retrieved from https://www.cs.mcgill.ca/~jpineau/talks/jpineau-dagstuhl13.pdf (Year: 2013).*

(Continued)

*Primary Examiner* — Leonard A Sieger
(74) *Attorney, Agent, or Firm* — Seyfarth Shaw LLP

(57)　　　　　ABSTRACT

A method for controlling an ego agent includes periodically receiving policy information comprising a spatial environment observation and a current state of the ego agent. The method also includes selecting, for each received policy information, a low-level policy from a number of low-level policies. The low-level policy may be selected based on a high-level policy. The method further includes controlling an action of the ego agent based on the selected low-level policy.

14 Claims, 6 Drawing Sheets

(51) Int. Cl.
　　G06N 3/092 　　(2023.01)
　　G06N 7/01 　　(2023.01)

(56) References Cited

U.S. PATENT DOCUMENTS

| 2018/0113461 A1* | 4/2018 | Potnis | B60W 60/0059 |
| 2018/0170392 A1* | 6/2018 | Yang | B60W 50/14 |
| 2019/0126472 A1 | 5/2019 | Tunyasuvunakool et al. | |
| 2020/0089245 A1* | 3/2020 | Yadmellat | G01C 21/3407 |
| 2020/0104680 A1 | 4/2020 | Reed et al. | |
| 2021/0001873 A1* | 1/2021 | Ingrody | G05D 1/0276 |
| 2021/0357782 A1* | 11/2021 | Graves | G06N 3/006 |

OTHER PUBLICATIONS

Murphy, "A brief introduction to reinforcement learning", 1998, retrieved from https://www.cs.ubc.ca/~murphyk/Bayes/pomdp.html (Year: 1998).*

Comanici et al., "Optimal policy switching algorithms for reinforcement learning", 9th International Conference on Autonomous Agents and Multiagent Systems (AAMAS 2010), vol. 1-3, pp. 709-714 (Year: 2010).*

Nair et al., "Overcoming Exploration in Reinforcement Learning with Demonstrations", 2018, arXiv, v 1709.10089v2, pp. 1-8 (Year: 2018).*

Qiao et al., "POMDP and Hierarchical Options MDP with Continuous Actions for Autonomous Driving at Intersections", 2018, 2018 21st International Conference on Intelligent Transportation Systems (ITSC), vol. 21(2018), pp. 2377-2382 (Year: 2018).*

Wang et al., "Learning hierarchical behavior and motion planning for autonomous driving", May 8, 2020, arXiv, v 2005.03863v1, pp. 1-8 (Year: 2020).*

Daniel et al., "Probabilistic inference for determining options in reinforcement learning", 2016, Machine Learning, vol. 104.2-3, pp. 337-357 (Year: 2016).*

Chen et al., "Attention-based hierarchical deep reinforcement learning for lane change behaviors in autonomous Driving", 2019, 2019 IEEE/RSJ International Conference on Intelligent Robots and Systems (IROS), vol. 2019, pp. 3697-3703 (Year: 2019).*

Hartmann et al., "Deep Reinforcement Learning for Time Optimal Velocity Control using Prior Knowledge", Mar. 12, 2019, arXiv, v2, pp. 1-7 (Year: 2019).*

Tingwall, "We Crash Four Cars Repeatedly to Test the Latest Automatic Braking Safety Systems", 2018, retrieved from https://www.caranddriver.com/features/a24511826/safety-features-automatic-braking-system-tested-explained/ on Jul. 25, 2023 (Year: 2018).*

Duan et al., "Hierarchical reinforcement learning for self-driving decision-making without reliance on labelled driving data", Feb. 11, 2020, Special Issue: AI Applications to Intelligent Vehicles for Advancing Intelligent Transport System (Year: 2020).*

Zhang et al., "Hierarchical Reinforcement Learning for Multi-agent MOBA Game", 2019, arXiv, v6, pp. 1-7 (Year: 2019).*

Frans et al., "Meta Learning Shared Hierarchies", 2017, arXiv, v1, pp. 1-11 (Year: 2017).*

Abbel et al., "Apprenticeship learning via inverse reinforcement learning", 2004, Proceedings of the twenty-first international conference on Machine learning, vol. 2004, pp. 1-8 (Year: 2004).*

Zhu et al., "Human-like autonomous car-following model with deep reinforcement learning", 2018, Transportation Research Part C, vol. 97 (2018), pp. 348-368 (Year: 2018).*

Liaw et al., "Composing Meta-Policies for Autonomous Driving Using Hierarchical Deep Reinforcement Learning", 2017, arXiv, v 1711.01503v1, pp. 1-8 (Year: 2017).*

Richter et al., "Bayesian Learning for Safe High-Speed Navigation in Unknown Environments", 2017, Springer Proceedings in Advanced Robotics, vol. 3, pp. 325-341 (Year: 2017).*

Codevilla et al., "End-to-end Driving via Conditional Imitation Learning", 2018, arXiv, v 1710.02410v2, pp. 1-8 (Year: 2018).*

Abbeel et al., "Apprenticeship learning via inverse reinforcement learning", 2004, ICML '04: Proceedings of the twenty-first international conference on Machine learning, vol. 2004, pp. 1-8 (Year: 2004).*

Maurer et al., "Designing a Guardian Angel: Giving an Automated Vehicle the Possibility to Override its Driver", 2018, AutomotiveUI '18: Proceedings of the 10th International Conference on Automotive User Interfaces and Interactive Vehicular Applications, vol. 2018, pp. 341-350 (Year: 2018).*

Jeong et al., "Surround Vehicle Motion Prediction Using LSTM-RNN for Motion Planning of Autonomous Vehicles at Multi-Lane Turn Intersections", Jan. 13, 2020, IEEE Open Journal of Intelligent Transportation Systems, vol. 1, pp. 2-14 (Year: 2020).*

Ohn-Bar et al., "Learning Situational Driving", Jun. 13, 2020, 2020 IEEE/CVF Conference on Computer Vision and Pattern Recognition (CVPR), vol. 2020, pp. 11293-11302 (Year: 2020).*

Kuefler et al., "Burn-In Demonstrations for Multi-Modal Imitation Learning", 2017, arXiv, v1, pp. 1-8 (Year: 2017).*

Silver et al., "Learning Autonomous Driving Styles and Maneuvers from Expert Demonstration", 2013, Experimental Robotics: The 13th International Symposium on Experimental Robotics, vol. 13, pp. 371-386 (Year: 2013).*

Kuderer et al., "Learning driving styles for autonomous vehicles from demonstration", 2015, 2015 IEEE International Conference on Robotics and Automation (ICRA), vol. 2015, pp. 2641-2646 (Year: 2015).*

Le, et al., "Hierarchical Imitation and Reinforcement Learning," found at https://arxiv.org/abs/1803.00590, last revised Jun. 9, 2018.

Ngai, et al., "A Multiple-Goal Reinforcement Learning Method for Complex Vehicle Overtaking Maneuvers," IEEE Transactions on Intelligent Transportation Systems, vol. 12, No. 2, pp. 509-522, Jun. 2011.

Chowdhuri, et al., "MultiNet: Multi-Modal Multi-Task Learning for Autonomous Driving," found at https://arxiv.org/abs/1709.05581, last revised Jan. 14, 2019.

Li, et al., "InfoGAIL: Interpretable Imitation Learning from Visual Demonstrations," found at https://arxiv.org/abs/1703.08840, last revised Nov. 14, 2017.

Dayan, et al., "Feudal Reinforcement Learning," Advances in Neural Information Processing Systems, 1993, pp. 271-278.

Bhattacharyya, et al., "Multi-Agent Imitation Learning for Driving Simulation," found at https://arxiv.org/abs/1803.01044, submitted Mar. 2, 2018.

* cited by examiner

REINFORCEMENT LEARNING BASED CONTROL OF IMITATIVE POLICIES FOR AUTONOMOUS DRIVING

CROSS-REFERENCE TO RELATED APPLICATION

The present application claims priority to U.S. Provisional Patent Application No. 63/040,190, filed on Jun. 17, 2020, and titled "REINFORCEMENT LEARNING BASED CONTROL OF IMITATIVE POLICIES FOR NEAR-ACCIDENT DRIVING," and claims priority to U.S. Provisional Patent Application No. 63/052,194, filed on Jul. 15, 2020, and titled "REINFORCEMENT LEARNING BASED CONTROL OF IMITATIVE POLICIES FOR NEAR-ACCIDENT DRIVING," the disclosures of which are expressly incorporated by reference herein in their entireties.

BACKGROUND

Field

Certain aspects of the present disclosure generally relate to autonomous driving systems.

Background

Autonomous agents (e.g., vehicles, robots, etc.) employ machine learning models to navigate through an environment. In most cases, the machine learning model may learn a policy based on reinforcement learning or imitation learning. It is desirable to improve a machine learning model's ability to model phase transitions. A phase transition may occur when a change in an agent's state causes a change in an optimal action, such as an optimal trajectory for arriving at a destination.

SUMMARY

In one aspect of the present disclosure, a method for controlling an ego agent is disclosed. The method includes periodically receiving policy information comprising a spatial environment observation and a current state of the ego agent. The method also includes selecting, for each received policy information, a low-level policy from a number of low-level policies, the low-level policy selected based on a high-level policy. The method further includes controlling an action of the ego agent based on the selected low-level policy.

In another aspect of the present disclosure, a non-transitory computer-readable medium with non-transitory program code recorded thereon is disclosed. The program code is for controlling an ego agent. The program code is executed by a processor and includes program code to periodically receive policy information comprising a spatial environment observation and a current state of the ego agent. The program code also includes program code to select, for each received policy information, a low-level policy from a number of low-level policies, the low-level policy selected based on a high-level policy. The program code further includes program code to control an action of the ego agent based on the selected low-level policy.

Another aspect of the present disclosure is directed to an apparatus. The apparatus having a memory, one or more processors coupled to the memory, and instructions stored in the memory. The instructions being operable, when executed by the processor, to cause the apparatus to periodically receive policy information comprising a spatial environment observation and a current state of the ego agent. The instructions also cause the apparatus to select, for each received policy information, a low-level policy from a number of low-level policies, the low-level policy selected based on a high-level policy. The instructions additionally cause the apparatus to control an action of the ego agent based on the selected low-level policy.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may employ machine learning models to navigate through an environment. In conventional systems, the machine learning model may learn a policy based on reinforcement learning or imitation learning. Reinforcement learning explores a state-action space to find a policy that maximizes reward signals. Imitation learning imitates a behavior of an agent from demonstrations, such as expert demonstrations. Based on imitation learning or reinforcement learning, the machine learning model may learn a smooth policy across states. That is, based on the smooth policy, actions of one state may generalize to actions of neighboring states.

Rapid phase transitions that occur in the state space reduce the performance of the smooth policies. Rapid phase transitions occur when a small change in the state results in a large change in the corresponding optimal action. Additionally, rapid phase transitions may affect the safety of the smooth policies. The states where rapid phase transitions occur can be referred to as critical states. Rapid phase transitions may occur in various driving scenarios, such as a near-accident scenario. In a near-accident scenario, to avoid a collision, an action of one state may not generalize to actions of neighboring states. That is, the optimal policy to handle rapid phase transitions may be a non-smooth policy. Therefore, it is desirable to improve a policy of a machine learning model to account for rapid phase transitions. Aspects of the present disclosure are directed to improving a machine learning model's ability to handle rapid phase transitions.

Aspects of the present disclosure are not limited to an autonomous agent. Aspects of the present disclosure also contemplate an agent operating in a semi-autonomous mode. In the autonomous mode, an agent control system operates the agent without human intervention. In the semi-autonomous mode, a human may operate the agent, and the agent control system may override or assist the human. For example, the agent control system may override the human to prevent a collision or to obey one or more traffic rules.

Figure 1:
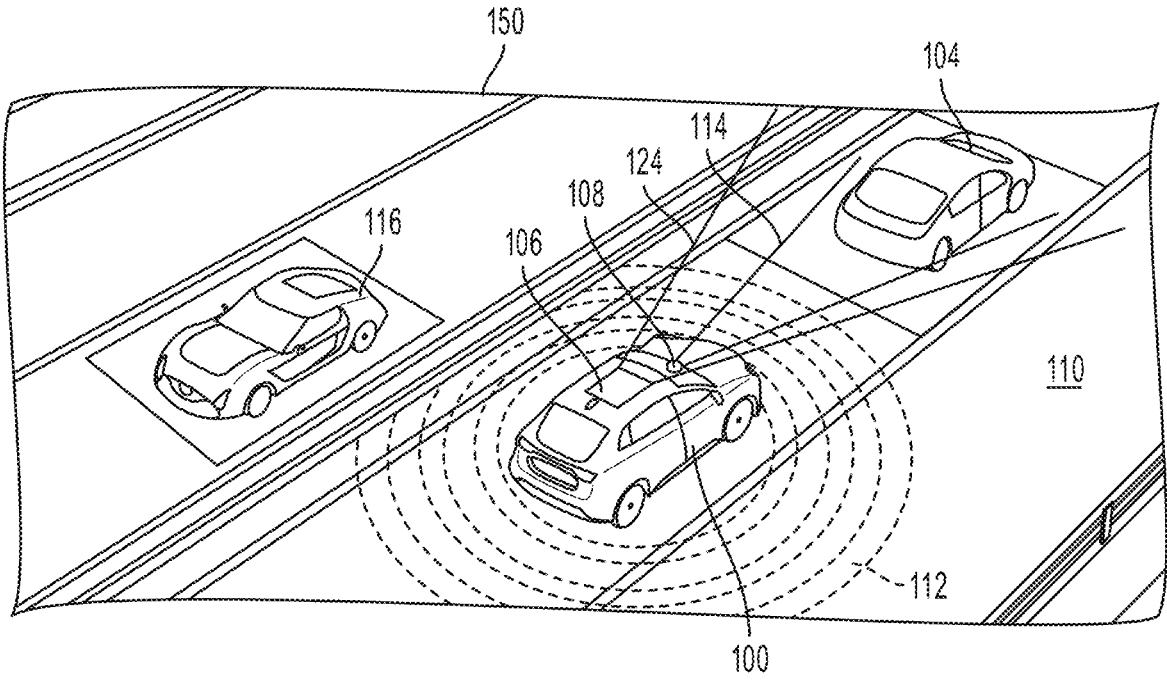
FIG. 1 is a diagram illustrating an example of a vehicle in an environment according to aspects of the present disclosure.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a two-dimensional (2D) camera 108, such as a 2D red-green-blue (RGB) camera, and a second sensor 106. The second sensor 106 may be another RGB camera or another type of sensor, such as radio detection and ranging RADAR, light detection and ranging (LiDAR), and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the second sensor 106 and the 2D camera 108 may be used to navigate the ego vehicle 100 along a route when the ego vehicle 100 is in an autonomous mode or a semi-autonomous mode. The second sensor 106 and the 2D camera 108 may be powered from electricity provided from the vehicle's 100 battery (not shown). The battery may also power the vehicle's motor.

Figure 2:
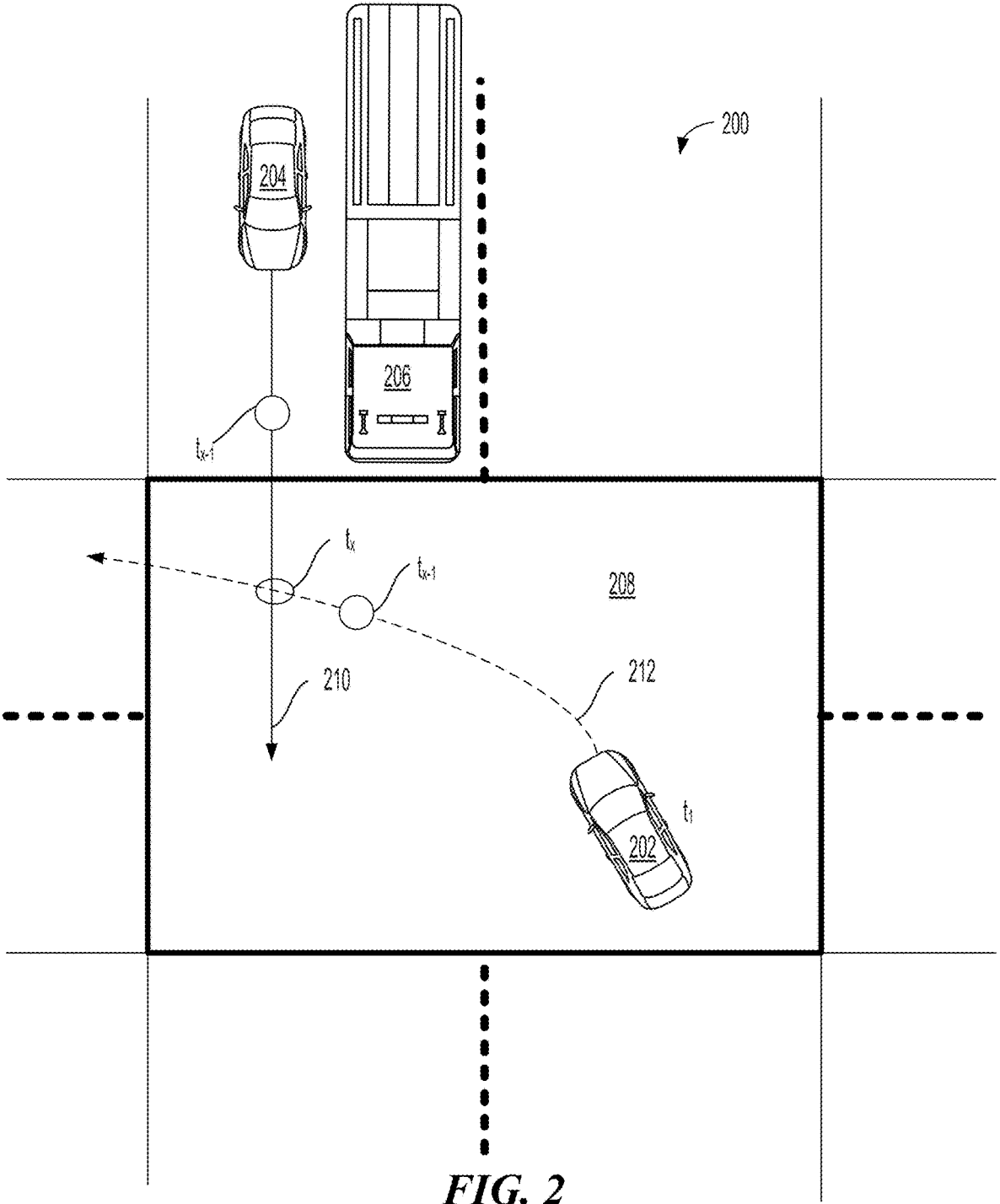
FIG. 2 is a diagram illustrating a driving scenario.

FIG. 2 is a diagram illustrating an example of a near-accident scenario 200. As shown in FIG. 2, an ego agent 202 is turning through an intersection 208 along a first path 212. The ego agent 202 is an example of the ego vehicle 100 described with reference to FIG. 1. In this example, a current driving mode of the ego agent 202 is an aggressive mode. The aggressive mode is used for illustrative purposes. Alternatively, the ego agent 202 may operate in another type of driving mode.

In the example of FIG. 2, at a time $t_1$, a first agent 206 prevents the ego agent 202 from detecting a second agent 204 traveling along a second path 210. Should the ego agent 202 and the second agent 204 continue along their paths 210 and 212, the agents 202, 204 may collide at a time $t_x$, where x is greater than two.

In one example, at a time $t_{x-1}$, the second agent 204 may detect the ego agent 202 while traveling along the second path 210. In response to detecting the ego agent 202, the second agent 204 may reduce its speed prior to reaching the intersection 208. In this example, at the time $t_{x-1}$, the ego agent 202 may detect the second agent's 204 reduction in speed. In response to detecting the reduction in speed, the ego agent 202 may maintain the current driving mode for the current time step (e.g., the time $t_{x-1}$).

As another example, the second agent 204 may not detect the ego agent 202 and may accelerate prior to reaching the intersection 208. In this example, at the time $t_{x-1}$, the ego agent 202 may detect the second agent's 204 increased speed. In response to detecting the increased speed, at the time $t_{x-1}$, the ego agent 202 may change the driving mode to the timid mode, causing the ego agent 202 to stop and yield to avoid a collision with the second agent 204. This exemplifies a rapid phase transition where a small change in the agent 204's speed causes a large change in the optimal action of agent 202. As another example, in response to detecting the increased speed, at the time $t_{x-1}$, the ego agent 202 may change the driving mode to a more aggressive mode, causing the ego agent 202 to accelerate to avoid a collision with the second agent 204.

The change from an aggressive mode to the timid mode, and the change from the aggressive mode to the more aggressive mode are examples of non-smooth transitions. Aspects of the present disclosure are not limited to the driving modes described for the example of FIG. 2, additional driving modes are contemplated. The rapid phase transition of FIG. 2 may also be referred to as phase transitions. The term "rapid" is used for ease of explanation.

To improve safety, as well as autonomous navigation in general, an agent's policy should handle rapid phase transitions, where the optimal action of one state may not generalize to neighboring states. When training a policy for an agent, an autonomous navigation model (e.g., machine learning model) should individually visit and handle all states (e.g., critical states) for navigation to determine whether the autonomous navigation model and/or the agent can handle rapid phase transitions. Individually visiting and handling all states may be computationally inefficient for conventional systems.

As described, in conventional systems, a machine learning model for an autonomous driving system may learn a policy. For example, the policy is learned based on reinforcement learning or imitation learning. It is desirable to improve the policy to further improve safety in various driving scenarios, such as a near-accident scenario.

Aspects of the present disclosure are not limited to a machine learning model for the autonomous driving system. The system may be a semi-autonomous system or another type of system for navigating according to a learned policy. Additionally, aspects of the present disclosure are not limited to driving systems. Other types of navigation systems, such as a flight system, are contemplated.

In some cases, conventional autonomous driving systems are based on manually designed rules. Still, it is tedious, if not impossible, to enumerate all the driving rules and norms to deal with all possible driving states. Therefore rule-based systems may cause an agent to drive in an unnatural manner or fail unexpected edge cases. As such, the manually designed rules may cause the agent to drive in an unnatural or unsafe manner in a near-accident scenario.

In some cases, conventional machine learning models learn a policy based on imitation learning (IL). In this example, the policy may be learned from multiple demonstrations in a variety of driving scenarios. For ease of explanation, the multiple demonstrations may be referred to as expert demonstrations. A large data set of expert demonstrations may be specified for imitation learning. Therefore, the learning may be tedious and time-consuming. In some conventional systems, conditional imitation learning provides high-level commands, and a separate imitation learning model is learned for each command. The agent acts on high-level commands provided at test time. For example, a driver may provide a command, such as a direction at an intersection. In contrast, rather than depending on drivers, aspects of the present disclosure learn a switching policy to improve reaction times for rapid transition phases.

Some conventional machine learning models learn a policy based on inverse reinforcement learning (IRL). IRL recovers a reward function from expert demonstrations. The reward may be represented by a weighted sum of a number of reward features relevant to the task. IRL learns weights by observing the performance of the task. Similar to imitation learning, IRL also specifies a large data set of expert demonstrations. Additionally, a process for defining reward features that accurately characterize efficiency and safety in various scenarios may be time-consuming. Therefore, driving policies learned from IRL may fail in near-accident scenarios.

In some cases, conventional machine learning models learn a policy based on reinforcement learning (RL). Reinforcement learning explores an environment to identify an action that maximizes an expected return for each state based on a pre-defined reward function. However, the state-action space for driving is large. Therefore, exploring the state-action space of a maximized expected return may be resource and time intensive. Accordingly, policies learned from reinforcement learning may be suboptimal (e.g., slow to react) in some scenarios, including near-accident scenarios where suboptimal actions might have severe consequences.

Hierarchical reinforcement learning (RL) is motivated by feudal reinforcement learning, which proposes a multi-layer hierarchical structure for reinforcement learning. In one example, a higher layer acts as a manager to set a goal for a lower layer, which acts as a worker to satisfy the goal. Hierarchical RL improves exploration for the higher level by providing a reduced action space (e.g., goal space). That is, the action space may be reduced in comparison to conventional reinforcement learning, as described above. Additionally, the reinforcement learning in the lower level is improved based on an explicit and short-horizon goal.

Hierarchical RL may be extended to solve complex tasks. As an example, imitation learning may be specified to learn a high-level policy model, which leverages expert feedback to improve exploration of the goal space. That is, a time for exploring the goal space may be reduced. Still, it may be difficult to define a reward function for the low-level RL specified in conventional hierarchical RL techniques. Therefore, for some driving scenarios, such as near-accident scenarios, off-the-shelf hierarchical RL techniques do not address the problem of driving safely and efficiently.

Aspects of the present disclosure are directed to a hierarchy of reinforcement learning and imitation learning, where imitation learning is used for the low-level to learn a basic policy for each mode, and reinforcement learning is used for the high-level to learn a mode switching policy that maximizes the return based on a reward function. The reward function may be pre-defined. The hierarchy of reinforcement learning and imitation learning may be referred to as hierarchical reinforcement and imitation learning (H-REIL) or a hierarchical model.

In one configuration, the low-level policies are learned by imitation learning for discrete driving modes. Each driving mode may represent a different driving style, such as aggressive, safe, efficient, and/or the like. Additionally, as described, the high-level policy for switching between the discrete driving modes is learned by reinforcement learning. Thus, based on hierarchical reinforcement learning and imitation learning, phase transitions may be modeled as switches between the discrete driving modes. Examples of driving modes include, but are not limited to, timid and aggressive.

In real-world driving, various factors influence the behaviors of human drivers. The factors may include, for example, resource use (e.g., fuel or battery efficiency), efficiency (e.g., time to a destination), and/or safety (e.g., collision avoidance). Aspects of the present disclosure are not limited to efficiency, speed, and safety. Other factors are contemplated.

Different modes characterize different trade-offs between factors. For example, in the aggressive mode, it may be desirable to reach a destination in a shortest amount of time. Therefore, in the aggressing mode, speed may outweigh safety and efficiency. As another example, in a timid mode, the agent may drive at, or below, a speed limit and monitor all potential threats. Thus, in the timid mode, safety may outweigh speed and efficiency. Switching from one mode to another may model the phase transitions conditioned on environment changes.

Based on aspects of the present disclosure, the low-level policy for each driving mode may be learned with imitation learning based on a small sample of expert demonstrations. That is, the number of expert demonstrations for the current implementation may be less than the number of expert demonstrations for a conventional system. The number of expert demonstrations may be reduced because, for each driving mode, the imitation learning learns a simpler and specific policy limited to one driving style with a reduced number of phase transitions. In some implementations, the imitation learning learns the driving mode with no phase transitions. In the current example, reinforcement learning may not learn the low-level policies as it may be difficult to define the reward function.

For the high-level policy, reinforcement learning may learn to maximize a return based on a reward that contains a trade-off between various factors, such as efficiency and safety. Furthermore, the action space may be reduced from an infinite continuous space to a finite discrete space. Imitation learning may not be used to learn the high-level policy, because human drivers may not accurately demonstrate how to switch driving modes.

Aspects of the present disclosure combine reinforcement learning at the high-level and imitation learning at the low-level in a hierarchical model. The hierarchical model may use both approaches (reinforcement learning and imitation learning) to learn driving policies in a wide variety of scenarios, including near-accident driving scenarios.

During training, traffic may be modeled as a partially observable Markov decision process (POMDP): $P_f=\langle S, \Omega, O, A, f, R \rangle$. During training, a scenario terminates by a collision, by reaching a destination, or by a time-out. Therefore, the POMDP may be a finite horizon. S is a set of states, $\Omega$ is a set of observations, O is a set of conditional observation probabilities, A is a set of actions, $f$ is a transition function, and R is a reward function. The training may be modeled as a POMDP in a simulated environment due to the danger associated with training near-accident scenarios in a real-world environment.

Each state $s' \in S$ consists of positions and velocities of all agents in the spatial are of the ego agent at time step t. Each action $a' \in A$ is a throttle and steering control available for the ego agent at time step t. That is, A is the set of all possible throttle and steering values and $a'$ is an instance from the set. At each time step t one or more adjacent agents move, the state $s'$ transitions to a new state $s'^{+1}$ according to the transition function $f$. The transition function $f$ may be modeled as a probability distribution $P(s'^{+1}|s', a')=f(s', a', s'^{+1})$ where stochasticity comes from noise and the uncertainty about the other vehicles' actions. In one implementation, $a'$ includes the throttle and steering of the ego vehicle. Still, other agents are present in the environment (e.g., the traffic). The ego agent has no control over the other agents. Therefore, there is stochasticity when predicting the next state, which includes the next actions of the other agents. The prediction may also account for noise coming from the sensors. The ego agent receives an observation $o' \in \Omega$ with a likelihood condition on the state $s'$, $O(o'|s')$. That is, the ego agent receives observation $o'$ in the current state, where a likelihood of the observation at the current state is based on the conditional observation probability O( ). For example, if some vehicles are occluded behind a building, their information is missing in the observation. The ago agent receives a reward $R(s', a')$ at each time step t, which encodes desirable driving behavior. The reward is based on a throttle and steering control $a'$ selected for the given state $s'$.

Figure 3A:
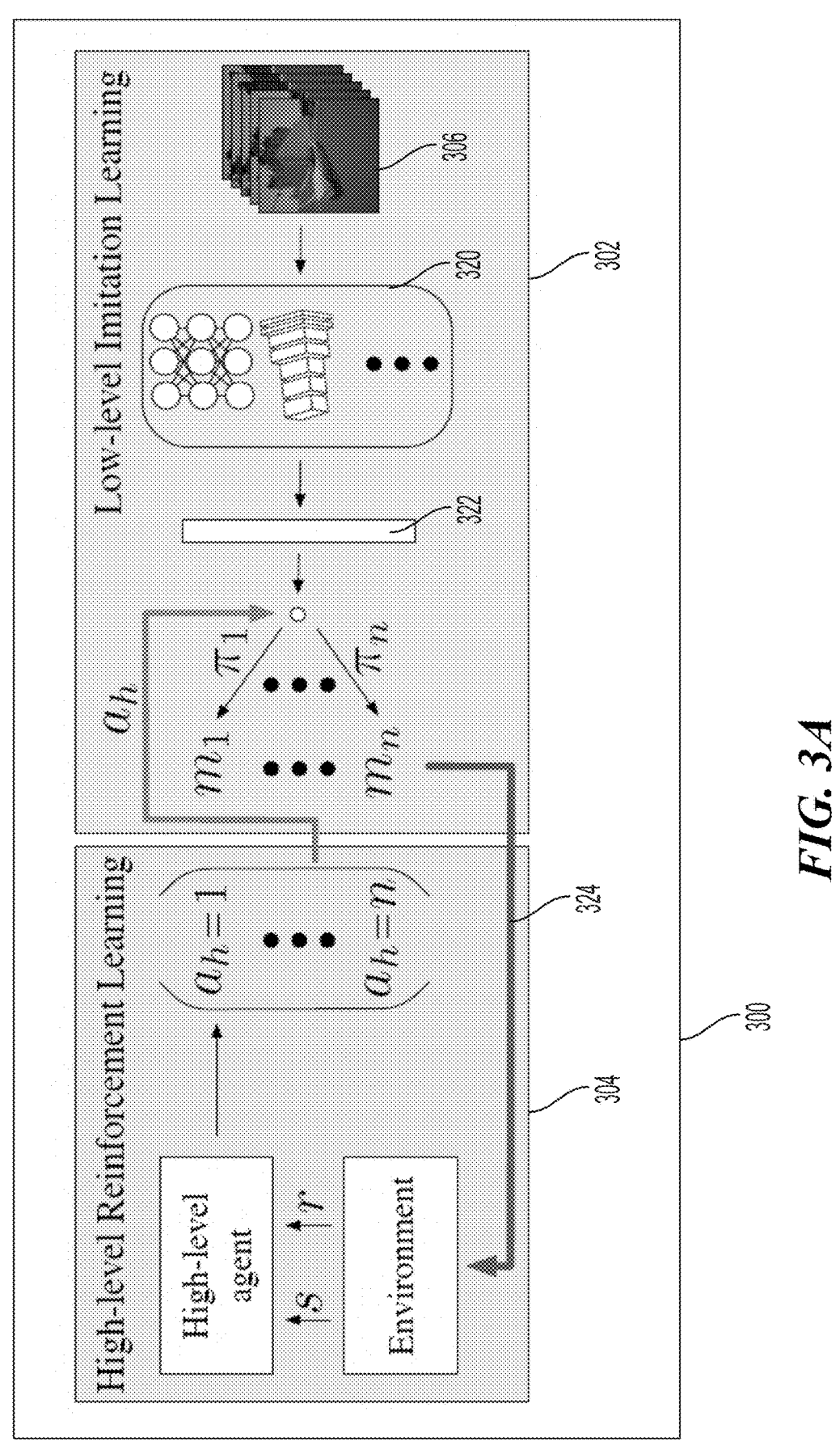
FIG. 3A is a block diagram illustrating an example of a hierarchical reinforcement and imitation learning (H-REIL) framework, in accordance with aspects of the present disclosure.

FIG. 3A is a block diagram illustrating an example of a hierarchical reinforcement and imitation learning (H-REIL) framework 300, in accordance with aspects of the present disclosure. As shown in FIG. 3A, the H-REIL framework 300 includes a low-level imitation learning model 302 and a high-level reinforcement learning model 304.

The low-level imitation learning model 302 may receive a sequence of frames 306. Each frame 306 may be an RGB image. During training, imitation learning observes expert demonstrations, which consist of the RGB images (e.g., frames 306) and the expert actions. During execution, the agent observes the RGB images (e.g., frames 306) and produces the actions itself. The frames 306 are input to a feature extractor 320. The model also includes a fully connected neural network layer 322 for designating a policy 7C based features extracted from each expert demonstration.

The low-level imitation learning model 302 of the H-REIL framework 300 may be designed using a set of n experts, each expert represents a different driving mode. The experts may not be optimal with respect to a true reward function for safe and efficient driving. As described, the modes may be timid or aggressive, for example. A policy $\pi$ may be designated based on each expert $(\pi_1, \ldots, \pi_n)$ (as shown in FIG. 3A), where $\pi_i: \Omega \rightarrow A, \forall i$. Each observation maps to an action. The same action may correspond to multiple observations. The low-level imitation learning model 302 learns the low-level policies $\pi_i|_{i=1}{}^n$ with imitation learning based on the expert demonstrations.

Additionally, the high-level reinforcement learning model 304 learns a high-level policy $\Pi$ based on the learned low-level policies $\pi_i|_{i=1}{}^n$ and a high-level decision making POMDP $P_h{}^{ts}$, described below. The high-level policy $\Pi$ switches between the different driving modes to outperform individual low-level policies $\pi_i$ in terms of cumulative reward. The high-level reinforcement learning model 304 learns the high-level policy $\Pi$ with reinforcement learning.

As described, each low-level policy $\pi_i$ is limited to one driving style. Each driving style may be consistent across states with a limited number of, or zero, rapid phase transitions. Therefore, for each driving style, the actions taken in nearby states can generalize to each other. In one implementation, the low-level policies may be learned by imitation learning based on expert demonstrations. The number of expert demonstrations may be less than the number of expert demonstrations used in conventional systems. Given such expert demonstrations, imitation learning may train a model that maps perceptual inputs to control commands. For example, sensor inputs (e.g., RGB images) may be mapped to steering and acceleration.

That is, each expert demonstration $\mathcal{H}_i$, where $\mathcal{H}_i=\{o_i{}^t, a_i{}^t\}|_{t=1}{}^K$, includes observation-action pairs for each mode $m_i$, and K is the finite horizon of the POMDP. Each policy $\pi_i$ corresponds to a different mode $m_i$. For each demonstration $\mathcal{H}_i|_{i=1}{}^n$, the observation-action pairs correspond to an observation $o_i{}^t$ (e.g., sensor input) received at a time step t and an action $a_i{}^t$ (e.g., control command) taken in response to the observation. A loss for the imitation learning may be defined as:

$$l_{IL} = \frac{1}{n}\sum_i{}^n \frac{1}{K}\sum_{k=1}{}^K \ell_1(a_i^t, \pi_i(o_i^t)), \tag{1}$$

where the mean over L1 distances is obtained. In EQUATION 1, $l_1$ is a function for calculating the L1 loss between the expert action and the policy actions. The L1 loss may be the sum of the absolute value of the difference between the expert action and the policy actions, such as, for example, |expert throttle–policy throttle|+|expert steering–policy steering|. The low-level policies $\pi_i|_{i=1}{}^n$ may be modeled using a neural network with branching at the end. Each branch may correspond to an individual policy $\pi_i$.

After training the low-level policies $\pi_i|_{i=1}{}^n$, the high-level policy $\Pi$ may be trained. The high-level policy $\Pi$ is trained to select a low-level policy, from $S_\pi=\{\pi_i\}_{i=1}{}^n$, for the ego agent, $S_\pi$ is the set of low level policies that have been learned via imitation learning. The high-level decision may be made every $t_s$ time steps of the POMDP $P_l$. During testing, the high-level decision may be made periodically (e.g., at a pre-determined interval) and/or in response to a trigger.

The high-level decision making may be modeled as a POMDP $P_h{}^{ts}$, where the states and observations are the same as the POMDP $P_l$ used for modeling traffic. The environment in FIG. 3, may be the POMDP $P_h{}^{ts}$. In the example of FIG. 3, high-level policy obtains the state from the environment (e.g., the observation) Based on the state, the high-level policy selects the high level action $a_h$. Based on the selected high-level action $a_h$, one of the low level policies is executed to obtain the corresponding driving mode m. This mode is then performed, which is indicated by the feedback 324. For ease of explanation, the POMDPs may be referred to as a traffic modeling POMDP $P_l$ and a high-level decision making POMDP $P_h^{ts}$. The actions of the high-level decision making POMDP may select a driving mode. For example, if the action is two (e.g., $a_h=2$) the ego agent may follow a second policy $\pi_2$ for the next $t_s$ time steps in the traffic modeling POMDP $P_l$, which is one time step in the high-level decision making POMDP $P_h^{ts}$. As shown in FIG. 3A, the action $a_h$ selects a policy $\pi_i$.

The high-level decision making POMDP $P_h^{ts}=10:12\langle S, \Omega, O, A_h, f_h^{ts}, R_h^{ts}\rangle$. In one implementation, the action space $A_h$ is a discrete space, $\{1, 2, \ldots, n\}$, representing a selection of low-level policies. The transition function $f_h^{ts}(s^t, a_h, s^{t+1})$ provides a probability of reaching $s^{t+1}$ from $s^t$ by applying policy $\pi_{a_h}$ for a number $t_s$ of time steps in the traffic modeling POMDP $P_l$. The reward function $R_h^{ts}$ accumulates the reward from the traffic modeling POMDP $P_l$ over the number $t_s$ of time steps in which the policy $\pi_{a_h}$ is followed.

The goal in the high-level reinforcement learning model 304 is to solve:

$$\arg\max_{\Pi} \mathbb{E}\left[\left(\sum_j \sum_{o} j\, O(o^j \mid s^j) R_h^{ts}(s^j, \prod(o^j)\right)\right] \qquad (2)$$

$$\text{subject to } s^{j+1} \sim f_h^{ts}\left(s^j, \prod(o^j), s^{j+1}\right) \text{ for } \forall j,$$

where indexing j denotes the time steps of the high-level decision making POMDP $P_h^{ts}$. EQUATION 2 may be solved using reinforcement learning. In the high-level decision making POMDP $P_h^{ts}$, the action space may be reduced from continuous to discrete, which improves exploration of the environment.

Additionally, a reward function may be easier to define, in comparison to conventional systems. Specifically, the ego agent satisfies some properties by following the policies learned from the expert demonstrations. For example, given a time step $t_s$ greater than a time threshold, a jerk motion consideration is reduced, because the experts naturally give low-jerk demonstrations. Therefore, a simple reward function may be defined, where the simple reward function consists of the efficiency and safety terms ($R_e$ and $R_s$). In one implementation, the efficiency reward $R_e$ is negative in every time step, so that the ego agent will try to reach its destination as quickly as possible. The safety reward $R_s$ may be set to a large negative value if a collision occurs, otherwise, the safety reward $R_s$ is zero. The efficiency reward $R_e$ and safety reward $R_s$ are not limited to the aforementioned methods, other methods may be used for determining the efficiency reward $R_e$ and/or safety reward $R_s$.

TABLE 1 provides pseudo-code for a training function for the H-REIL framework 300 according to aspects of the present disclosure.

TABLE 1

Input: Expert demonstrations $\mathcal{H}_1, \ldots, \mathcal{H}_n$, high-level
decision making POMDP $P_h^{ts}$
Output: Low-level policies $\pi_i|_{i=1}^n$, high-level policy $\Pi$.
The low-level policies $\pi_i|_{i=1}^n$ are trained with demonstrations
$\mathcal{H}_i|_{i=1}^n$ to minimize the loss of EQUATION 1.
The high-level policy is trained using the low-level policies $\pi_i|_{i=1}^n$
high-level decision making POMDP $P_h^{ts}$ according to
EQUATION 2, with proximal policy optimization (PPO)

During test mode, the H-REIL framework 300 may be used with any finite number of modes. For ease of explanation, aspects of the present disclosure have been described with two modes: aggressive and timid modes. In the aggressive mode, the ego agent favors efficiency over safety. For example, the ego agent may drive fast and has an increased collision rate in comparison to the timid mode. In the timid mode, the ego agent drives in a safe manner to avoid potential accidents. For example, the ego agent may slow down whenever the risk of an accident is above a threshold. In one implementation, the high-level agent learns to switch between the two modes to drive safely and efficiently in near-accident scenarios.

During testing, the H-REIL framework, such as the H-REIL framework 300 as described in FIG. 3A, may receive input data consisting of an ego agent's location, the ego agent's velocity, and front-view image (not shown in FIG. 3A). Optionally, the H-REIL framework 300 receives right-front and right-view images. Additional input data may be provided. The ego agent's location may be obtained from a positioning sensor, such as a GPS sensor. The ego agent's velocity may be provided by a velocity sensor. The front-view images and other images may be provided view one or more imaging sensors, such as an RGB camera, RADAR, and/or LiDAR. The sensors may be integrated with the ego agent.

An object detection model, such as a convolutional neural network, may detect agents in the images and localize the detected agents with a bounding box. The images with the agents localized with bounding boxes may be referred to as detection images. In some implementations, such as turning in an intersection, the detection images may be black, and the bounding boxes may be white to clearly localize the agents and alleviate environmental noise. In other implementations, such as a merge scenario, a full RGB image may be used for the detection image.

A second neural network may include a convolutional neural network encoder and a fully-connected network encoder. The convolutional encoder encodes the detection image, and the fully-connected encoder encodes the location and velocity information of the ego agent into features. The high-level reinforcement learning policy feeds the features into a fully-connected network to select a mode (e.g., low-level imitation learning policy) for the ego agent. The features may include the encoded detection image, location, and velocity. The features are then input to the selected low-level imitation learning policy neural network composed of fully-connected layers, at a number $t_s$ of low-level time steps, to obtain controls for the ego agent. The controls may adjust one or more of a throttle, a brake, and steering. That is, the controls may adjust a velocity and/or driving direction.

Figure 3B:
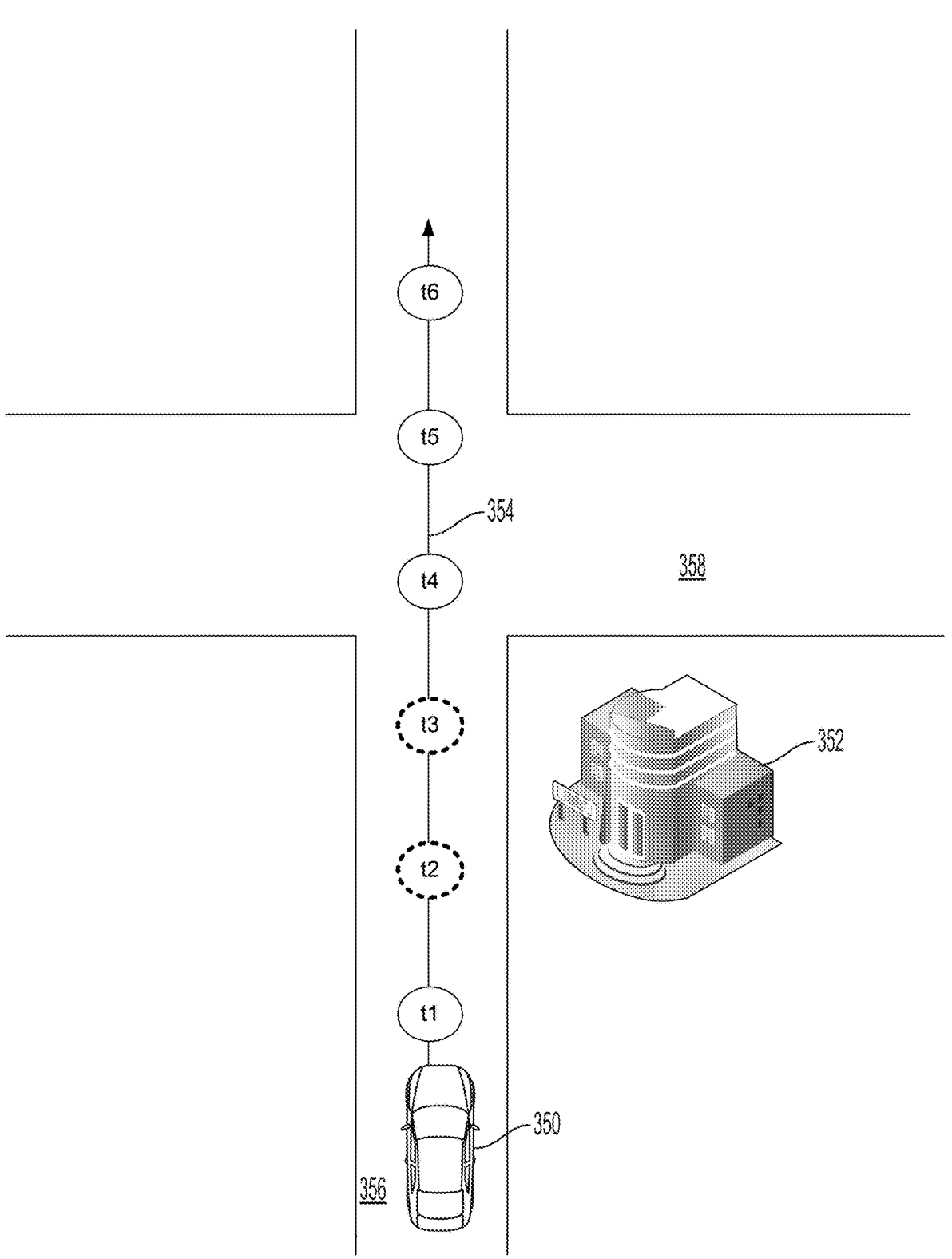
FIG. 3B is a diagram illustrating an example of an ego agent, in accordance with aspects of the present disclosure.

FIG. 3B is a diagram illustrating an example of an ego agent 350 operating in accordance with aspects of the present disclosure. As shown in FIG. 3B, the ego agent 350 is navigating along a trajectory 354 on a first road 356. In this example, by default, the ego agent 350 operates in a first driving mode, such as an aggressive mode. Thus, in this example, at time t1, the ego agent 350 operates in the first driving mode. The ego agent 350 may be configured to perform a high-level decision based on a high-level policy at every time step.

In the example of FIG. 3B, at time t2, a view of the second road 358 is occluded by the building 352. Based on the training, to maximize a reward, the high-level policy selects an action based on the occluded second road 358. In this example, based on the selected action, at time t2, the ego agent 350 selects a low-level policy corresponding to a second driving mode, such as a timid mode. At time t3, the second road 358 is still occluded by the building 352, therefore, the high-level policy selects the low-level policy corresponding to the second driving mode.

Additionally, at time t4, the second road 358 is no longer occluded. In this example, at time t4, the high-level policy selects an action based on the ego agent 350 having a clear view of the second road 358. In this example, based on the selected action, at time t4, the ego agent 350 selects a low-level policy corresponding to the first driving mode (e.g., the aggressive mode). The ego agent 350 may continue in the first driving mode for the times t5 and t6.

Figure 4:
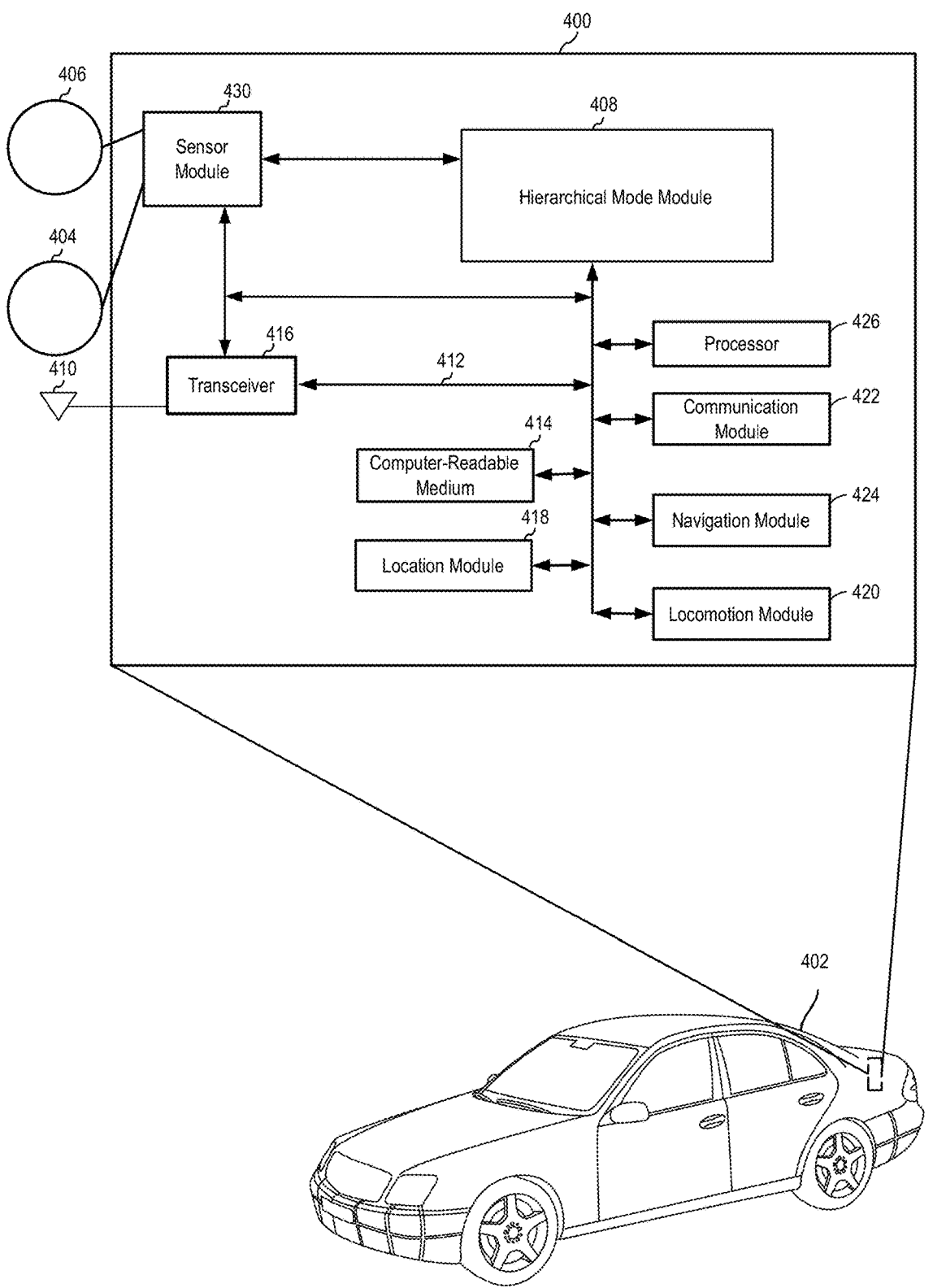
FIG. 4 is a diagram illustrating an example of a hardware implementation for an autonomous navigation system, in accordance with aspects of the present disclosure.

FIG. 4 is a diagram illustrating an example of a hardware implementation for an autonomous navigation system 400, according to aspects of the present disclosure. The autonomous navigation system 400 may be a component of a vehicle, a robotic device, or another device. For example, as shown in FIG. 4, the autonomous navigation system 400 is a component of a vehicle 402. Aspects of the present disclosure are not limited to the autonomous navigation system 400 being a component of the vehicle 402, as other types of agents, such as a bus, boat, drone, or robot, are also contemplated for using the autonomous navigation system 400.

The vehicle 402 may operate in one or more of an autonomous operating mode, a semi-autonomous operating mode, and a manual operating mode. Furthermore, the vehicle 402 may be an electric vehicle, a hybrid vehicle, a fuel vehicle, or another type of vehicle.

The autonomous navigation system 400 may be implemented with a bus architecture, represented generally by a bus 412. The bus 412 may include any number of interconnecting buses and bridges depending on the specific application of the autonomous navigation system 400 and the overall design constraints. The bus 412 links together various circuits including one or more processors and/or hardware modules, represented by a processor 426, a communication module 422, a location module 418, a sensor module 430, a locomotion module 420, a navigation module 424, and a computer-readable medium 414. The bus 412 may also link various other circuits such as timing sources, peripherals, voltage regulators, and power management circuits, which are well known in the art, and therefore, will not be described any further.

The autonomous navigation system 400 includes a transceiver 416 coupled to the processor 426, the sensor module 430, a hierarchical model module 408, the communication module 422, the location module 418, the locomotion module 420, the navigation module 424, and the computer-readable medium 414. The transceiver 416 is coupled to an antenna 410. The transceiver 416 communicates with various other devices over one or more communication networks, such as an infrastructure network, a V4V network, a V4I network, a V4X network, a V4P network, or another type of network.

The autonomous navigation system 400 includes the processor 426 coupled to the computer-readable medium 414. The processor 426 performs processing, including the execution of software stored on the computer-readable medium 414 providing functionality according to the disclosure. The software, when executed by the processor 426, causes the autonomous navigation system 400 to perform the various functions described for a particular device, such as the vehicle 402, or any of the modules 430, 408, 414, 416, 418, 426, 410, 410, 420. The computer-readable medium

414 may also be used for storing data that is manipulated by the processor 426 when executing the software.

The sensor module 430 may obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LI-DAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 406, 404.

The measurements of the first sensor 406 and the second sensor 404 may be processed by one or more of the processor 426, the sensor module 430, the hierarchical model module 408, the communication module 422, the location module 418, the locomotion module 420, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 402 or may be in communication with the vehicle 402.

The location module 418 may determine a location of the vehicle 402. For example, the location module 418 may use a global positioning system (GPS) to determine the location of the vehicle 402. The communication module 422 may facilitate communications via the transceiver 416. For example, the communication module 422 may be configured to provide communication capabilities via different wireless protocols, such as WiFi, long term evolution (LTE), 6G, etc. The communication module 422 may also be used to communicate with other components of the vehicle 402 that are not modules of the autonomous navigation system 400.

The locomotion module 420 may facilitate locomotion of the vehicle 402. As an example, the locomotion module 420 may control a movement of the wheels. As another example, the locomotion module 420 may be in communication with one or more power sources of the vehicle 402, such as a motor and/or batteries. Of course, aspects of the present disclosure are not limited to providing locomotion via wheels and are contemplated for other types of components for providing locomotion, such as propellers, treads, fins, and/or jet engines.

The autonomous navigation system 400 also includes the navigation module 424 for planning a route or controlling the locomotion of the vehicle 402, via the locomotion module 420. In one configuration, the navigation module 424 engages a defensive driving mode when the hierarchical model module 408 identifies a risky agent. The navigation module 424 may override user input when the user input is expected (e.g., predicted) to cause a collision. The modules may be software modules running in the processor 426, resident/stored in the computer-readable medium 414, one or more hardware modules coupled to the processor 426, or some combination thereof.

The hierarchical model module 408 may be in communication with and/or work in conjunction with one or more of the sensor module 430, the transceiver 416, the processor 426, the communication module 422, the location module 418, the locomotion module 420, the navigation module 424, and the computer-readable medium 414. In one configuration, the hierarchical model module 408 receives sensor data from the sensor module 430. The sensor module 430 may receive the sensor data from the first sensor 406 and the second sensor 404. According to aspects of the present disclosure, the sensor module 430 may filter the data to remove noise, encode the data, decode the data, merge the data, extract frames, or perform other functions. In an alternate configuration, the hierarchical model module 408 may receive sensor data directly from the first sensor 406 and the second sensor 404.

The hierarchical model module 408 may periodically receive policy information comprising a spatial environment observation and a current state of the vehicle 402. For example, the spatial environment observations may be obtained from the first sensor 406, the second sensor 404, and/or the sensor module 430. A current state of the vehicle 402 may be obtained from one or more of the processor 426, the communication module 422, the location module 418, the locomotion module 420, the navigation module 424, and/or the computer-readable medium 414.

The hierarchical model module 408 may also select, for each observation, a low-level policy from a number of low-level policies, the low-level policy selected based on a high-level policy. The hierarchical model module 408 may work in conjunction with one or more of the processor 426 and the computer-readable medium 414 to select a low-level policy.

The hierarchical model module 408 may further control an action of the vehicle 402 based on the low-level policy. The hierarchical model module 408 may work in conjunction with one or more of the processor 426, the communication module 422, the locomotion module 420, the navigation module 424, and/or the computer-readable medium 414 to control the action of the vehicle 402.

The hierarchical model module 408 may implement a reinforcement learning model and an imitation learning model. The models may include one or more neural networks, such as convolutional neural networks, convolutional encoders, and fully-connected networks.

The hierarchical model module 408 may implement a H-REIL framework, such as the H-REIL framework 300 described with reference to FIG. 3A. Additionally, the hierarchical model module 408 may be configured to implement a process, such as the process 500 described with reference to FIG. 5.

Figure 5:
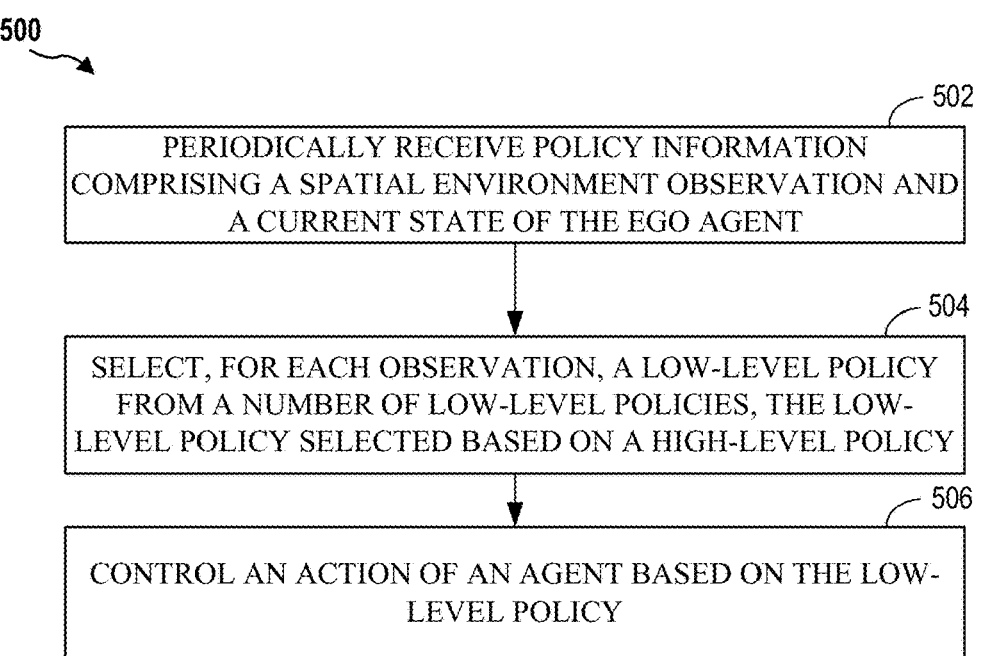
FIG. 5 is a diagram illustrating an example process performed, for example, by an autonomous vehicle, in accordance with various aspects of the present disclosure.

FIG. 5 illustrates a flow diagram for a process 500 for controlling a vehicle, in accordance with aspects of the present disclosure. The process 500 may be performed by one or more of a vehicle, such as the ego vehicle 100 described with reference to FIG. 1, and/or a hierarchical model module 408 as described with reference to FIG. 4.

As shown in FIG. 5, the process 500 includes periodically receiving policy information comprising a spatial environment observation and a current state of an ego agent (block 502). The process 500 may also include selecting, for each observation, a low-level policy from a number of low-level policies, the low-level policy is selected based on a high-level policy (block 504). The process 500 further includes controlling an action of the ego agent based on the low-level policy (block 506). The controlling may include adjusting a velocity (e.g., throttle or brake) and/or a driving direction (e.g., steering) of the ego agent.

The process 500 also includes training a high-level policy model to learn the high-level policy based on reinforcement learning. The process 500 further includes training a low-level policy model to learn the plurality of low-level policies based on imitation learning. The process 500 also includes receiving a set of expert demonstrations, each expert demonstration corresponding to a different driving mode. The same expert may provide different demonstrations. For example, one expert may demonstrate a timid mode as well as an aggressive mode. The process 500 further includes learning each low-level policy of the plurality of low-level policies based on a mapping of observations and commands obtained from one expert demonstration of the set of expert demonstrations. The spatial environment observation may be composed of an image of a spatial area adjacent to the ego agent. In addition, the current state may be composed a location of the ego agent and a velocity of the ego agent. Furthermore, each low-level policy of the of low-level policies corresponds to a unique driving mode.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for selecting a driving mode by a semi-autonomous vehicle, comprising:
   periodically receiving policy information comprising a respective position and a respective velocity of each agent within a given distance from the semi-autonomous vehicle and a current position and a current velocity of the semi-autonomous vehicle within an environment;

selecting, in accordance with a high-level policy, a driving mode of a group of driving modes that maximizes a reward from a reward function that is based on a conditional observation probability of the policy information, the reward function accounting for resource use, a time to a destination, and collision avoidance, the group of driving modes including at least an aggressive driving mode and a defensive driving mode, the conditional observation probability modeling uncertainty due to sensor noise, the conditional observation probability defining a probability of observing the policy information given an unobserved behavior of one or more agents in the environment;

selecting an action from a plurality of actions associated with the driving mode, each driving mode of the group of driving modes associated with a respective low-level policy from a plurality of low-level policies trained via imitation learning, the imitation learning comprising supervised training of a policy model to directly map observed states to expert-labeled actions from mode-specific demonstrations provided by a group of human operators, each one of the group of human operators manually operating a training vehicle in accordance with one or more driving modes of the group of driving modes, the action including a throttle and a steering command that adjusts one or both of a current velocity or a current driving direction of the semi-autonomous vehicle, the action being selected in accordance with the reward function; and overriding instructions from the human operator of the vehicle, such that the vehicle performs the action.

2. The method of claim 1, further comprising training, via reinforcement learning, a high-level policy model to learn the high-level policy based on each of the plurality of low-level policies.

3. The method of claim 2, in which training via the reinforcement learning comprises learning to maximize the reward function based on an action determined from a partially observable Markov decision process.

4. An apparatus for selecting a driving mode for a semi-autonomous vehicle, comprising:

at least one processor;

at least one memory coupled with the at least one processor; and instructions stored in the memory and operable, when executed by the at least one processor, to cause the apparatus to:

periodically receive policy information comprising a respective position and a respective velocity of each agent within a given distance from the semi-autonomous vehicle and a current position and a current velocity of the semi-autonomous vehicle within an environment;

select, in accordance with a high-level policy, a driving mode of a group of driving modes that maximizes a reward from a reward function that is based on a conditional observation probability of the policy information, the reward function accounting for resource use, a time to a destination, and collision avoidance, the group of driving modes including at least an aggressive driving mode and a defensive driving mode, the conditional observation probability modeling uncertainty due to sensor noise, the conditional observation probability defining a probability of observing the policy information given an unobserved behavior of one or more agents in the environment;

select an action from a plurality of actions associated with the driving mode, each driving mode of the group of driving modes associated with a respective low-level policy from a plurality of low-level policies trained via imitation learning, the imitation learning comprising supervised training of a policy model to directly map observed states to expert-labeled actions from mode-specific demonstrations provided by a group of human operators, each one of the group of human operators manually operating a training vehicle in accordance with one or more driving modes of the group of driving modes, the action including a throttle and a steering command that adjusts one or both of a current velocity or a current driving direction of the semi-autonomous vehicle, the action being selected in accordance with the reward function; and override instructions from the human operator of the vehicle, such that the vehicle performs the action.

5. The apparatus of claim 4, in which the instructions further cause the apparatus to train, via reinforcement learning, a high-level policy model to learn the high-level policy based on each of the plurality of low-level policies.

6. The apparatus of claim 5, in which the instructions further cause the apparatus to train via the reinforcement learning comprises learning to maximize the reward function based on an action determined from a partially observable Markov decision process.

7. A non-transitory computer-readable medium having program code recorded thereon for selecting a driving mode for a vehicle, the program code executed by at least one processor and comprising:

program code to periodically receive policy information comprising a respective position and a respective velocity of each agent within a given distance from the semi-autonomous vehicle and a current position and a current velocity of the semi-autonomous vehicle within an environment;

program code to select, in accordance with a high-level policy, a driving mode of a group of driving modes that maximizes a reward from a reward function that is based on a conditional observation probability of the policy information, the reward function accounting for resource use, a time to a destination, and collision avoidance, the group of driving modes including at least an aggressive driving mode and a defensive driving mode, the conditional observation probability modeling uncertainty due to sensor noise, the conditional observation probability defining a probability of observing the policy information given an unobserved behavior of one or more agents in the environment;

program code to select an action from a plurality of actions associated with the driving mode, each driving mode of the group of driving modes associated with a respective low-level policy from a plurality of low-level policies trained via imitation learning, the imitation learning comprising supervised training of a policy model to directly map observed states to expert-labeled actions from mode-specific demonstrations provided by a group of human operators, each one of the group of human operators manually operating a training vehicle in accordance with one or more driving modes of the group of driving modes, the action including a throttle and a steering command that adjusts one or both of a current velocity or a current driving direction of the semi-autonomous vehicle, the action being selected in accordance with the reward function; and program code to override instructions from the human operator of the vehicle, such that the vehicle performs the action.

8. The non-transitory computer-readable medium of claim 7, in which the program code further comprises program code to train, via reinforcement learning, a high-level policy model to learn the high-level policy based on each of the plurality of low-level policies.

9. The non-transitory computer-readable medium of claim 8, in which the program code to train via the reinforcement learning comprises program code to learn to maximize the reward function based on an action determined from a partially observable Markov decision process.

10. The method of claim 1, in which the reward functions maximizes a return based on minimizing a travel time to a destination and maximizing safety of the vehicle.

11. The apparatus of claim 4, in which the reward functions maximizes a return based on minimizing a travel time to a destination and maximizing safety of the vehicle.

12. The method of claim 1, in which the high-level policy is periodically selected in response to a trigger associated with the policy information.

13. The apparatus of claim 4, in which the high-level policy is periodically selected in response to a trigger associated with the policy information.

14. The non-transitory computer-readable medium of claim 7, in which the high-level policy is periodically selected in response to a trigger associated with the policy information.

* * * * *